(12) United States Patent
Henry et al.

(10) Patent No.: US 12,506,911 B2
(45) Date of Patent: Dec. 23, 2025

(54) QUALITY OF SERVICE ENHANCEMENTS FOR VIDEO AND EXTENDED REALITY APPLICATIONS OVER WIRELESS NETWORKS

(71) Applicant: Cisco Technology, Inc., San Jose, CA (US)

(72) Inventors: Jerome Henry, Pittsboro, NC (US); Robert E. Barton, Richmond (CA); Indermeet S. Gandhi, San Jose, CA (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 146 days.

(21) Appl. No.: 18/477,002

(22) Filed: Sep. 28, 2023

(65) Prior Publication Data

US 2024/0380932 A1   Nov. 14, 2024

Related U.S. Application Data

(60) Provisional application No. 63/501,564, filed on May 11, 2023.

(51) Int. Cl.
| | |
|---|---|
| *H04N 21/24* | (2011.01) |
| *H04N 21/238* | (2011.01) |
| *H04N 21/61* | (2011.01) |

(52) U.S. Cl.
CPC ....... *H04N 21/2402* (2013.01); *H04N 21/238* (2013.01); *H04N 21/6125* (2013.01)

(58) Field of Classification Search
CPC ............ H04N 21/2402; H04N 21/238; H04N 21/6125; H04N 21/234327; H04N 21/6131; H04N 21/64792

(Continued)

(56) References Cited

U.S. PATENT DOCUMENTS

| | | | |
|---|---|---|---|
| 2004/0213150 A1* | 10/2004 | Krause | H04L 65/1101 370/229 |
| 2006/0156200 A1* | 7/2006 | Zhang | H04L 47/2416 375/E7.005 |

(Continued)

FOREIGN PATENT DOCUMENTS

| | | |
|---|---|---|
| CN | 110312156 A | 10/2019 |
| WO | 2021114305 A1 | 6/2021 |

OTHER PUBLICATIONS

Ashley A., "Scs Request and Response Frames", IEEE, Jul. 2009, 1 Page, doc.: IEEE 802.11-09/0725r1.

(Continued)

*Primary Examiner* — Cynthia M Fogg
(74) *Attorney, Agent, or Firm* — Patterson + Sheridan, LLP

(57) ABSTRACT

Disclosed herein are a system and method for efficiently routing high-priority frames through a wireless network based on markings of the frames by a data link layer, a network layer, or an application layer in a five-layer protocol stack. When a real-time application, such as a video or gaming application, is to be sent to one or more stations in the wireless network, the access point determines the strategy for routing the high-priority frames based on the markings received from the data link, network, or application layer. Strategies include discarding non-I frames when there is congestion in the wireless network, replicating I-frames to assure reliable delivery to the stations, scheduling I-frames with preference, and moving I-frames ahead in a buffer in the access point.

20 Claims, 16 Drawing Sheets

(58) Field of Classification Search
USPC .......................................................... 725/146
See application file for complete search history.

(56) References Cited

U.S. PATENT DOCUMENTS

| | | | |
|---|---|---|---|
| 2008/0123660 | A1 | 5/2008 | Sammour et al. |
| 2014/0146676 | A1 | 5/2014 | Howes et al. |
| 2015/0256470 | A1 | 9/2015 | Stanwood et al. |
| 2015/0358382 | A1 | 12/2015 | Chen et al. |
| 2018/0027444 | A1* | 1/2018 | Maria ............... H04W 28/0268 370/235 |
| 2020/0112721 | A1* | 4/2020 | Tsilimantos ....... H04N 21/6131 |
| 2020/0374907 | A1* | 11/2020 | Viger .................... H04W 76/14 |
| 2022/0086450 | A1* | 3/2022 | Hultqvist ............... H04N 19/88 |
| 2022/0287051 | A1* | 9/2022 | Panchal ................ H04W 72/23 |
| 2023/0043261 | A1* | 2/2023 | Zhu .......................... H04L 47/28 |
| 2023/0337050 | A1* | 10/2023 | Guignard .............. H04W 72/12 |
| 2023/0370643 | A1* | 11/2023 | Lin ....................... H04W 28/04 |
| 2024/0172259 | A1* | 5/2024 | Sevin .................... H04W 84/12 |

OTHER PUBLICATIONS

Ashley A., "Intra-Access Priority IE", IEEE, Jul. 2009, 29 Pages, doc.: IEEE 802.11-09/0725r1.
Ashley A., "Stream Classification Service", IEEE, Jul. 6, 2009, 29 Pages, doc.: IEEE 802.11-09/0725r1.
Ashley A., "Stream Classification Service (SCS) Overview", IEEE, Jul. 2009, 1 Page, doc.: IEEE 802.11-09/0725r1.
Even R., et al., "Frame Priority Marking RTP Header Extension", draft-even-avtcore-priority-markings-03.txt, Internet-Draft, Standards Track, retrieved from http://www.watersprings.org/pub/id/draft-even-avtcore-priority-markings-03.html, Dec. 23, 2018, 3 Pages.
Nayarasi., "CWAP—MAC Header : QoS Control", mrn-cciew, retrieved from https://mrncciew.com/2014/10/03/cwap-mac-header-qos-control/, Oct. 3, 2014, 7 Pages.
Nichols K., et al., "Definition of the Differentiated Services Field (DS Field) in the IPV4 and IPV6 Headers", The Internet Society, Network Working Group, Request for Comments 2474, Dec. 1998, 20 Pages.
Policypak: "Windows 10 MDM vs Group Policy: 4 Risks You Cannot Ignore", Policypak Securing your Standards, retrieved from https://www.policypak.com/resources/pp-blog/windows-10-mdm/#:~:text=The%20major%20difference%20between%20Windows,a%20traditional%20Active%20Directory%20environment on Mar. 1, 2024, 6 Pages.
Prosecution History for U.S. Appl. No. 63/501,564, dated May 11, 2023, 25 Pages.
Schwarz H., et al., "Overview of the Scalable Video Coding Extension of the H.264/AVC Standard", IEEE Transactions on Circuits and Systems for Video Technology, Sep. 24, 2007, vol. 17, No. 9, 19 Pages.
Singh G., "Understand MAC Header Format in Detail", tbhaxor, retrieved from https://tbhaxor.com/mac-header-format-in-detail/, Nov. 30, 2022, 10 Pages.
Wikipedia: "Differentiated Services", Wikipedia, The Free Encyclopedia, retrieved from https://en.wikipedia.org/wiki/Differentiated_services, last edited on Feb. 11, 2024, 6 Pages.
Wikipedia: "Generic Advertisement Service", Wikipedia, The Free Encyclopedia, retrieved from https://en.wikipedia.org/wiki/Generic_Advertisement_Service, last edited on Sep. 25, 2020, 1 Page.
Wikipedia: "Real-time Transport Protocol", Wikipedia The Free Encyclopedia, retrieved from https://en.wikipedia.org/wiki/Real-time_Transport_Protocol, last edited on Feb. 3, 2024, 5 Pages.
Wirelesslan Professionals: "WI-FI Alliance Announcement | WI-FI QOS Management", retrieved from https://wlanprofessionals.com/?s=WI-FI+QOS, Oct. 21, 2022, 3 Pages.

* cited by examiner

QUALITY OF SERVICE ENHANCEMENTS FOR VIDEO AND EXTENDED REALITY APPLICATIONS OVER WIRELESS NETWORKS

CROSS-REFERENCE TO RELATED APPLICATIONS

This application claims benefit of U.S. provisional application Ser. No. 63/501,564 filed May 11, 2023. The aforementioned related patent application is herein incorporated by reference in its entirety.

TECHNICAL FIELD

Embodiments presented in this disclosure generally relate to the prioritized routing of information in a wireless network. More specifically, embodiments disclosed herein prioritized routing of video and extended reality data in a wireless network.

BACKGROUND

Real-time applications, such as video and extended reality applications, rely on the reliable transmission of certain critical portions of the application data. When the critical portions of the application data reach a wireless network, the wireless network may not have knowledge of the dependencies of other portions of the application data on the critical portions and thus may not assure that the critical portions are protected from loss or delay. For example, in a video application, the critical portions are the intra-coded frames (I-frames) or base frames in a group of pictures (GOP). It is important to ensure that the I-frames or base frames are not lost or delayed because other frames, such as P-frames and B-frames or enhancement frames, depend on them. Losing or delaying an I-frame or base frame leads to poor video quality or an application that does not work.

Similar issues arise in other applications, such as AR/VR systems in which polygons that draw the contours of an object are critical to the other polygons inscribed in the object.

In all these situations, the loss or delay of certain critical information has a greater impact than losing other non-critical information. Thus, the wireless network needs an indication of the critical information to prevent the delay or loss of critical information and deliver the expected performance of a real-time application.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method of improving video throughput in a wireless network. The method includes receiving an indication from a layer in a network protocol stack regarding video frames of a video application to be transmitted over the wireless network, converting the indication to a quality of service (QOS) value and a traffic id (TID) value at a data link layer, and processing the video frames in the wireless network according to the QoS and TID values.

Another embodiment presented in this disclosure is an access point for improving video transmission in a wireless network. The access point includes a processor and a memory that is coupled to the processor and has loaded therein a program which, when executed by the processor, is configured to receive an indication from a layer in a network protocol stack regarding video frames of a video application to be transmitted over the wireless network, convert the indication to a quality of service (QoS) value and a traffic id (TID) value at a data link layer; and process the video frames in the wireless network according to the QoS and TID values.

Yet another embodiment presented in this disclosure is a non-transitory computer-readable medium encoding instructions, which, when executed by a processor of an access point coupled to a wireless medium, cause the access point to: receive an indication from a layer in a network protocol stack regarding video frames of a video application to be transmitted over a wireless network, convert the indication to a quality of service (QOS) value and a traffic id (TID) value at a data link layer, and process the video frames in the wireless network according to the QoS and TID values.

EXAMPLE EMBODIMENTS

A system and method for informing the AP of a wireless network of high-priority traffic and processing the high-priority traffic in the wireless network are described herein.

Information at the application or network layers is provided to the AP regarding the traffic priority. In one embodiment, the application layer (following the 5-layer model) marks traffic using the RTP. In another embodiment, the network layer marks the traffic using the differentiated services facility. Based on the markings, the AP determines a strategy for routing the traffic through the wireless network to one or more stations (STAs) in the network. Strategies include discarding non-I frames when there is congestion in the wireless network, replicating transmission of I-frames to assure reliable delivery, scheduling I-frames with preference, and moving I-frames ahead in a buffer in the AP.

Figure 1A:
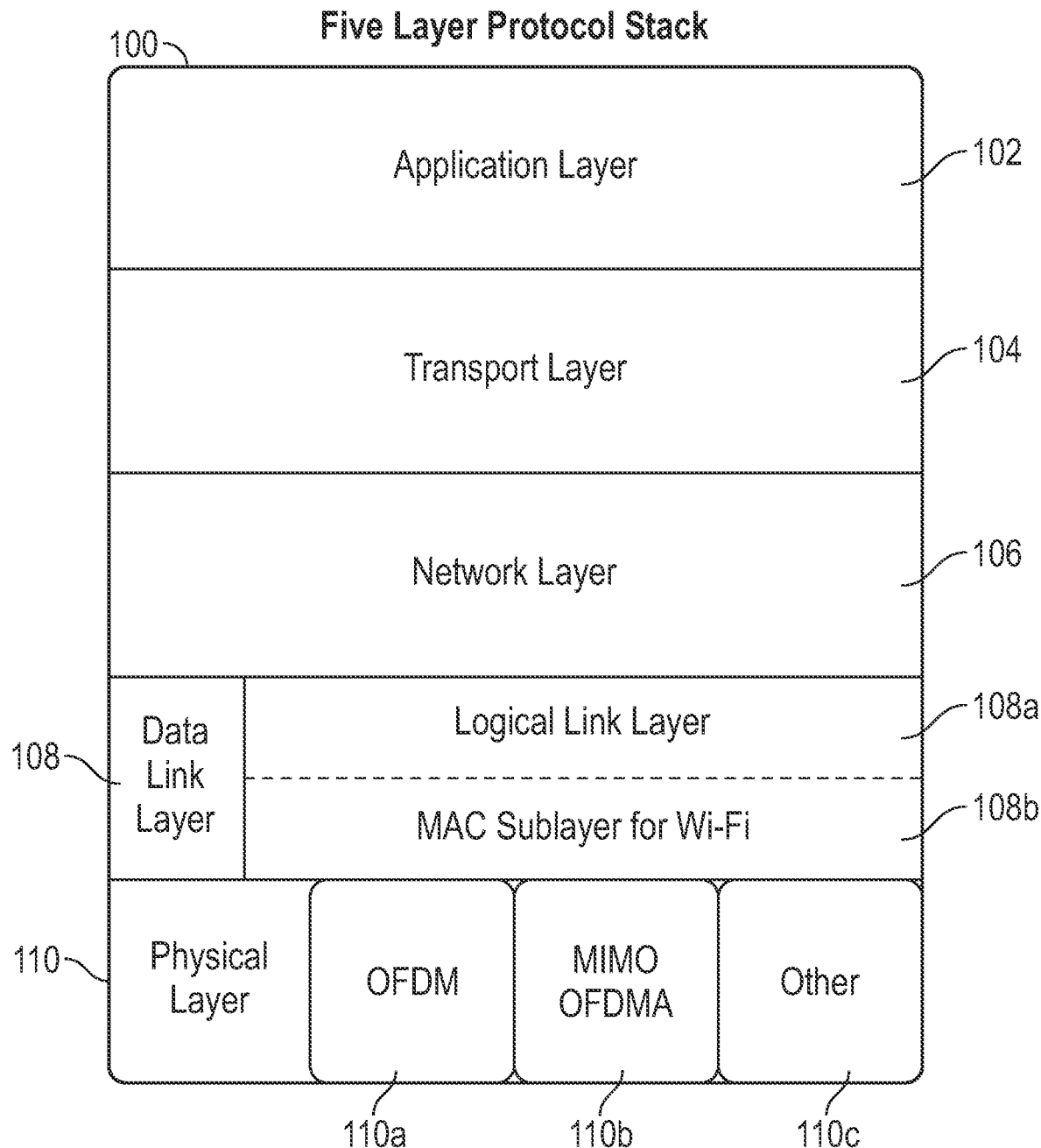
FIG. 1A depicts a five-layer protocol stack.

FIG. 1A depicts a five-layer protocol stack. The lowest layer of the five-layer stack 100 is the physical layer 110, which transfers data in the physical medium. The data transfers may occur according to orthogonal frequency division multiplexing (OFDM) 110*a* or multiple-in, multiple-out (MIMO) orthogonal frequency division multiple access (OFDMA) 110*b* or other PHY technologies 110*c*, such as OFDMA and MU (multiuser)-MIMO. Above the physical layer 110 is the data link layer 108, which includes a logical link layer 108*a* and a medium access (MAC) sublayer 108*b* when the physical medium is a broadcast medium, such as early versions of Ethernet, radio, or other electromagnetic frequencies such as terahertz, infra-red or light. Above the data link layer 108 is the network layer 106, which implements the internet protocol, such as IP. Above the network layer 106 is the transport layer 104, which implements either the user datagram protocol (UDP) or transport control protocol (TCP). The application layer 102 resides above the transport layer 104 and implements applications such as the World Wide Web (WWW). As information travels down the protocol stack, lower levels in the stack have access to information from the higher levels. An access point operating at the data link layer 108 thus has access to information provided by the network layer 106 and the application layer 102.

Figure 1B:
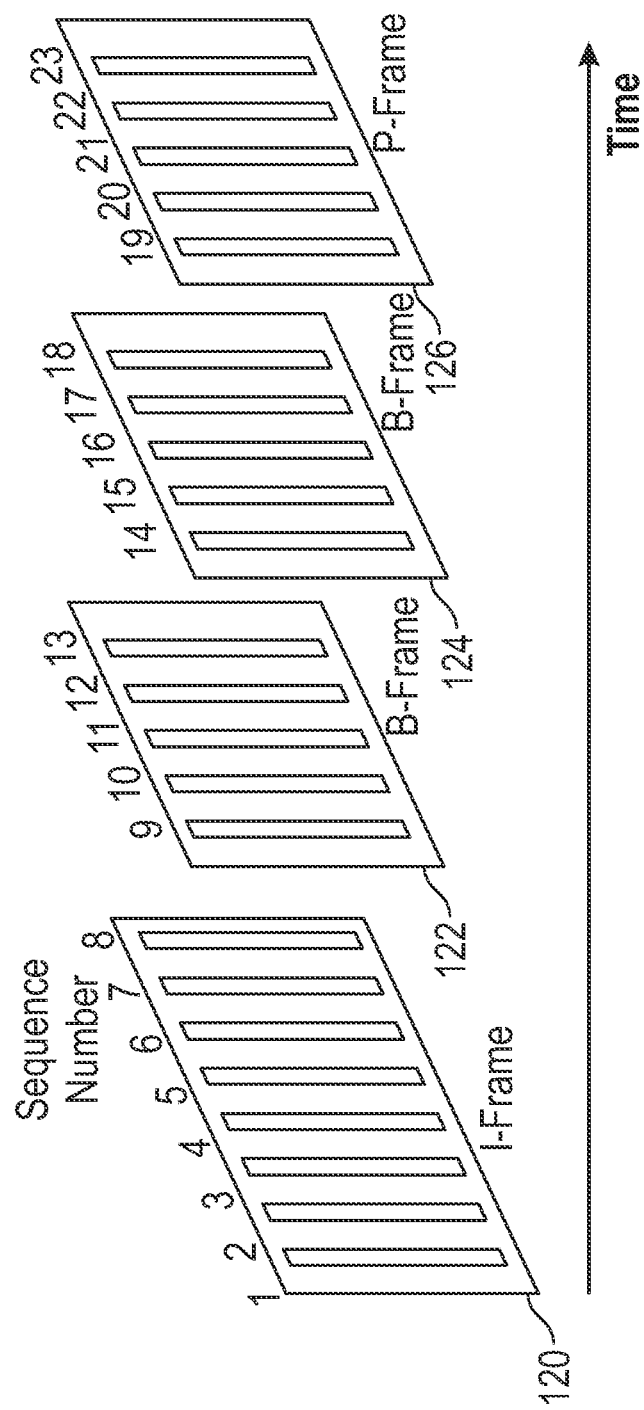
FIG. 1B depicts frames in a video stream according to one video coding layer standard.

FIG. 1B depicts frames in a video stream according to one video coding layer standard. The stream includes a GOP where the GOP includes I-frames 120 and non-I frames such as P-(predictive) frames 126 and B-(Bidirectional) frames 124, 126. A GOP is typically bound by I-frames 120 and is usually 15-60 frames long. Frames are marked with sequence numbers so that lost frames can be detected.

I-frames 120 are self-contained compressed still pictures. The P-frames 126 and B-frames 122 and 124 code interframe differences, where the differences for a P-frame 126 include only previous frames, and the differences for B-frames 122 and 124 may include both previous and future frames. To form interframe differences, frames are decomposed into macroblocks, and the differences between macroblocks are determined and encoded. Thus, the P-frames 126 and B-frames critically depend on the I-frames. Unless these I-frames are reliably transferred in a wireless network, the B-frames and P-frames cannot be constructed, making the entire video stream supplied to a STA in the wireless network unreliable.

In another video coding layer standard, a GOP includes a base layer and enhancement layers. Inter-layer predictions are used for the enhancement layers relative to the base layer.

Figure 2A:
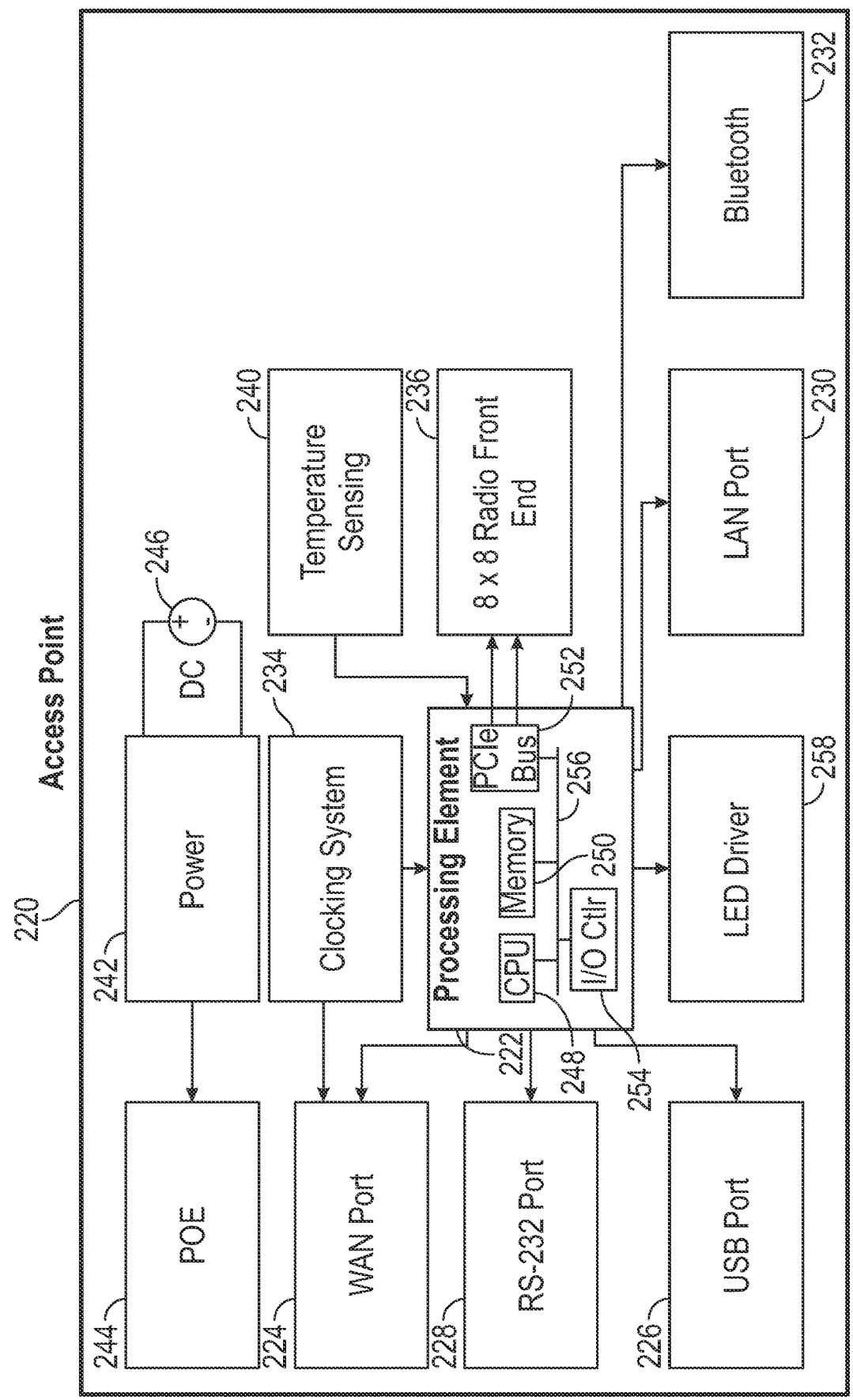
FIG. 2A depicts a representative access point (AP).

FIG. 2A depicts a representative architecture of an AP. The AP 220 includes a processing element 222 and several ports or connection facilities, such as a WAN port 224, USB port 226, RS-232 port 228, LAN port 230, and Bluetooth 232. Also included are a clocking system 234 and an 8×8 radio front-end 236 with a transmitter and receiver, which are coupled to eight external antennas. Auxiliary modules include a temperature sensing module 240, a power module 242 connected to a DC power source 246, a power over Ethernet (POE) module 244, and LED driver 258. Processing element 222 includes a CPU 248 and memory 250, a peripheral control interconnect express (PCIe) bus controller 252 for connecting to the 8×8 radio front-end 236, and an I/O controller 254, all coupled to each other via bus 256. Memory 250 may include one or more buffers for traffic entering or exiting AP 220.

Figure 2B:
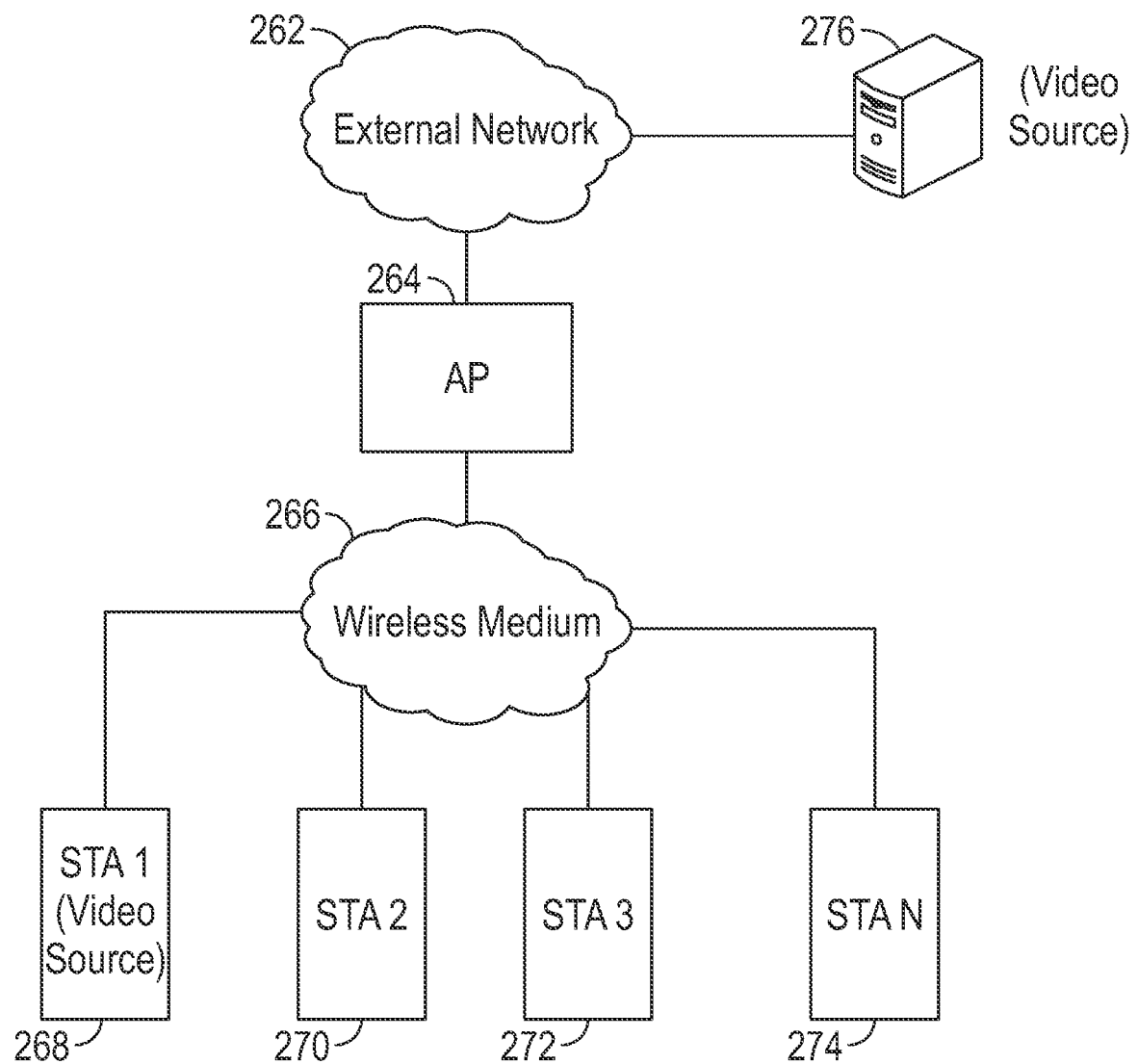
FIG. 2B depicts a network of APs and stations (STAs).

FIG. 2B depicts a network of APs and stations (STAs). In the figure, an external network 262, such as the Internet, is coupled to an AP 264, such as AP 220. The AP 264 is coupled to stations STA 1 268, STA 2 270, STA 3 272, and STA N 274 via a wireless medium 266. According to the figure, server 276 connected to the external network 262 or one of the stations, STA 1, can be a source for video, which is available to the other STAs 270, 272, and 274. For example, if STA 2 270 connects to an online TV service, server 276 delivers the video stream over the external network 262 to the AP 264 and then to STA 2 270 over wireless medium 266. In another example, if STA 1 268 is a video source such as a DVD player, STAs 270, 272, and 274 can watch the video stream from STA 1's source via the AP 264 and the wireless medium 266.

Figure 3A:
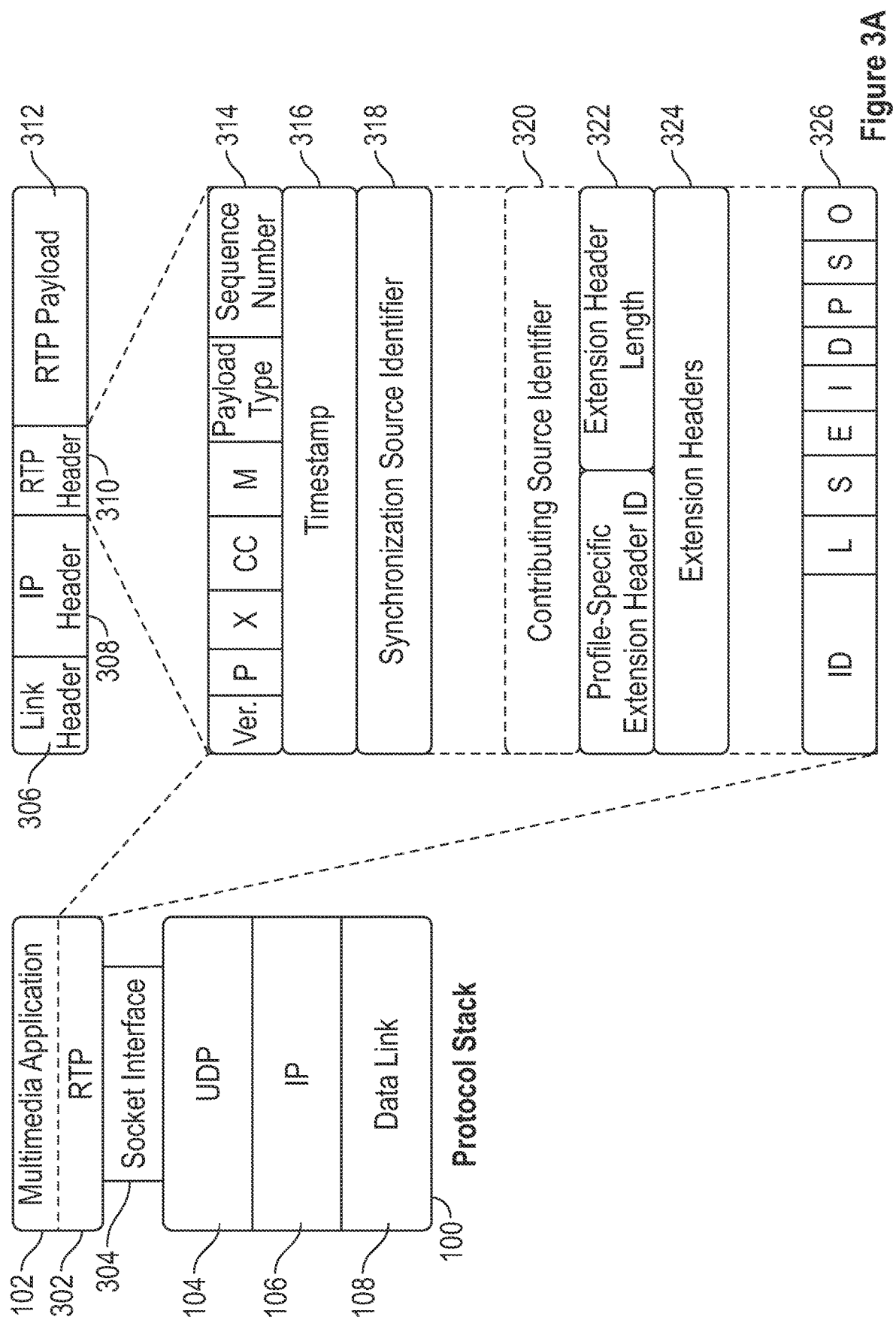
FIG. 3A depicts a) a protocol stack that includes the real-time transfer protocol (RTP) and b) the RTP header.

FIG. 3A depicts a protocol stack that includes RTP and the RTP header. The RTP 302 improves the operation of the multimedia application in application layer 102, such as a video or extended reality application via socket interface 304. In the protocol stack, a link-level frame includes a link header 306, an IP header 308, an RTP header 310, and an RTP payload 312. The RTP header 310 includes sections 314, 316, 318, 320, 322, and 324.

Section 314 includes the version number, a P-field, an X-field, a CC-field, an M-field, a payload type, and a sequence number. The P-field indicates that the packet has been padded. The X-field indicates that an extension header is present. The CC field tells how many contributing sources are present. The M-field is an application-specific marker bit that can be used to mark the start of a video frame or the start of a word in the audio channel. The payload type field indicates which encoding algorithm is being used. The sequence number is a counter that is incremented on each RTP packet that is sent.

Section 316 includes a timestamp. The stream's source produces the timestamp to note when the first sample in the packet was made.

Section 318 includes a synchronization source identifier. The synchronization source identifier tells which stream the packet belongs to.

Section 320 includes a contributing source identifier. The contributing source identifier is used when mixers are present in the audio.

Section 322 includes a profile-specific extension header ID and an extension header length.

Section 324 includes a number of extension headers, such as extension header 326. An extension header 326 includes the following fields: ID, L, S, E, I, D, P, and S. The P bits are priority bits, and if the D bit is set to 1, the value 00 for the P bits is the highest drop priority and the value 11 for the P bits is the lowest drop priority.

Figure 3B:
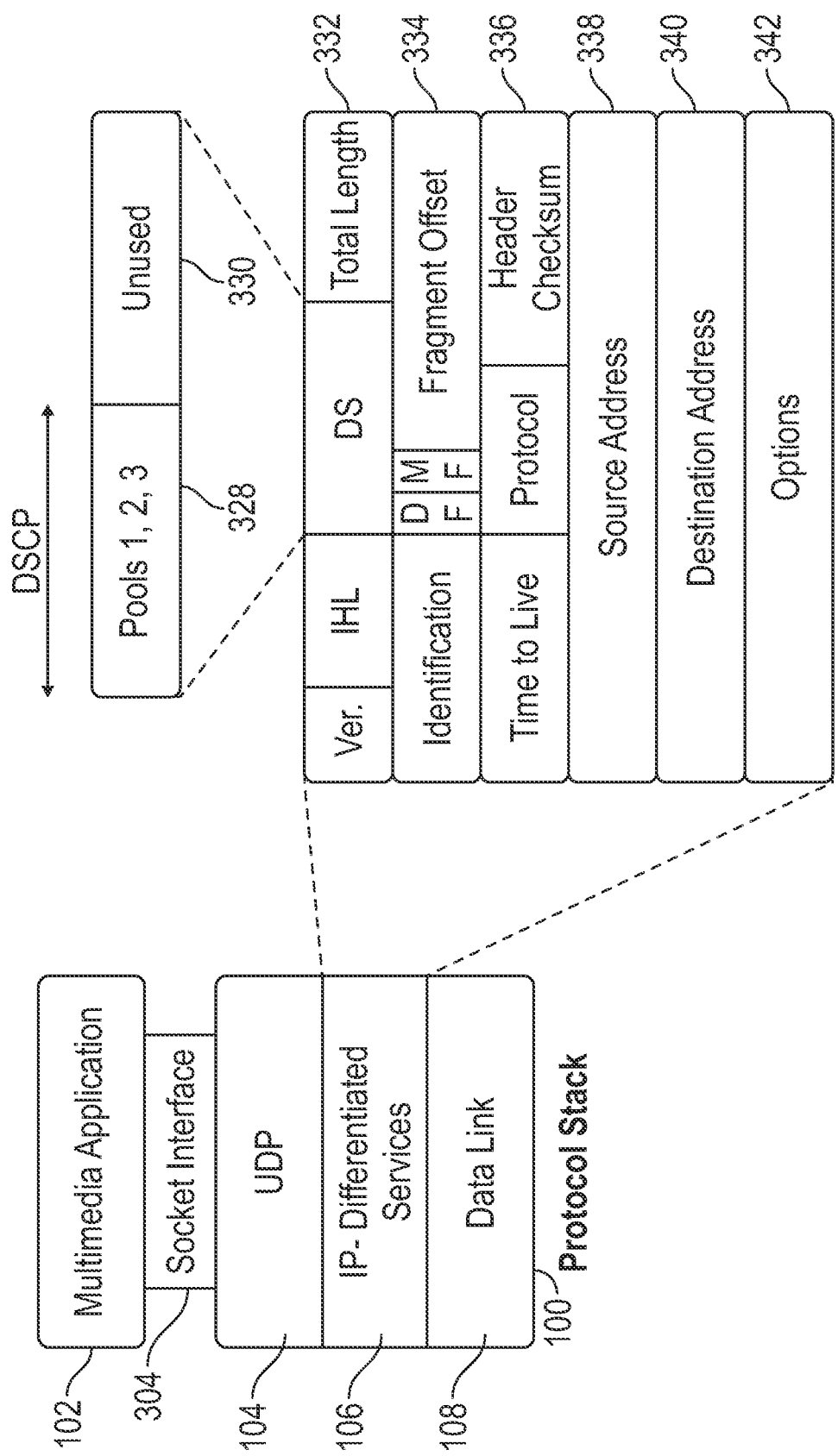
FIG. 3B depicts a) a protocol stack for differentiated services and b) the header for differentiated services.

FIG. 3B depicts a protocol stack for differentiated services and the internet protocol header for differentiated services. Differentiated services operates at the network layer 106 of five-layer protocol stack 100. When the network layer 106 is IP, the IP header includes sections 332, 334, 336, 338, 340, and 342.

Section 332 includes a version number, IHL, a differentiated services (DS) field, and a total length. The IHL field indicates the size of the header. The DS field (includes the DSCP field), which in turn includes a pools field 328 and an unused field 330. Pools field 328 specifies three types of pools: 1, 2, and 3. The total length indicates the size of the head and data. Values in pool 2 are independent of the DSCP values used for QoS classification. In some embodiments, the DSCP field is an index to a table in which elements select a particular packet-handling mechanism.

Pool 1 consists of 32 recommended codepoints to be assigned as standard. Pool 2 consists of 16 code points reserved for experimental or local use. Pool 3 includes 16 code points initially available for experimental or local use but is usable to extend pool 1 if pool 1 is exhausted.

Section 334 includes an identification field, DF, MF, and a fragment offset. The DF field tells routers not to fragment the packet. MF indicates that additional fragments are expected. The fragment offset indicates the position of the current fragment with respect to all of the fragments of a fragmented packet.

Section 336 includes a time to live, a protocol field, and a header checksum. The time-to-live field is a counter used to limit packet lifetime. The protocol field indicates the transport process to which the packet belongs. The header checksum is used to protect the header from errors.

Section 338 includes a source address. Section 340 includes a destination address, and section 342 includes an options field. The source address is the IP address of the source network interface, and the destination address is the IP address of the destination network interface.

Figure 3C:
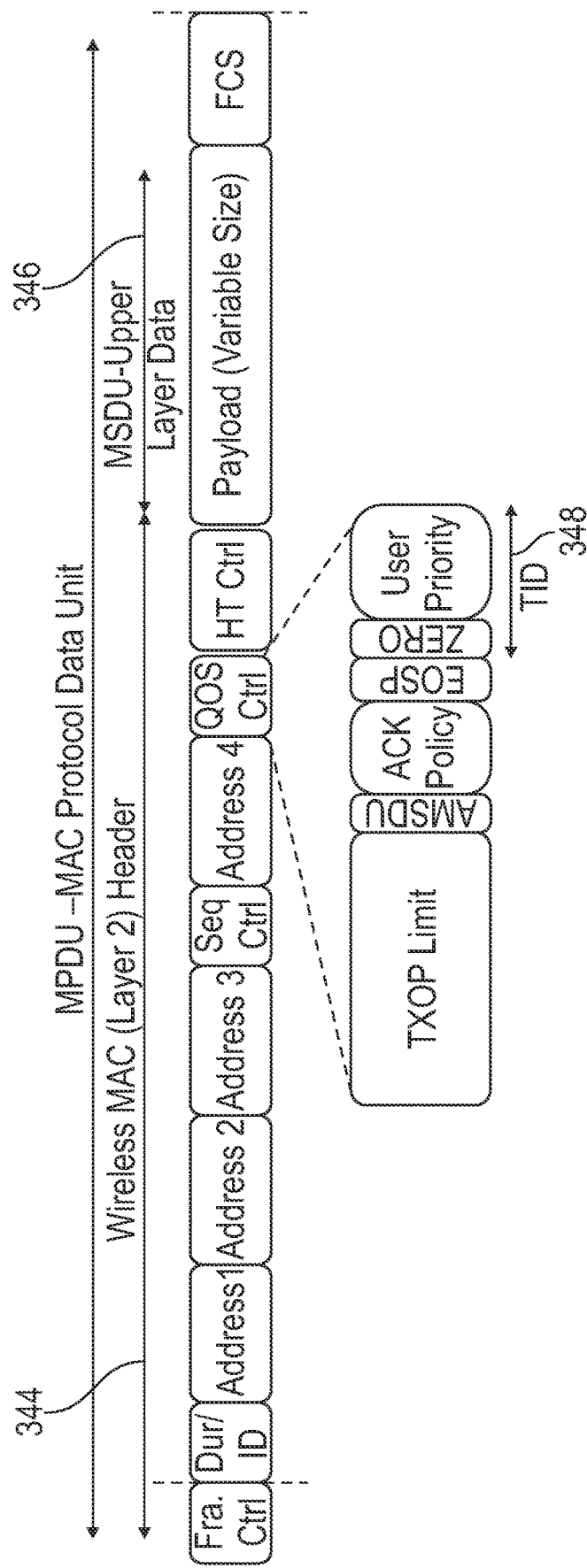
FIG. 3C depicts a MAC header that carries the QoS field.
Figure 3D:
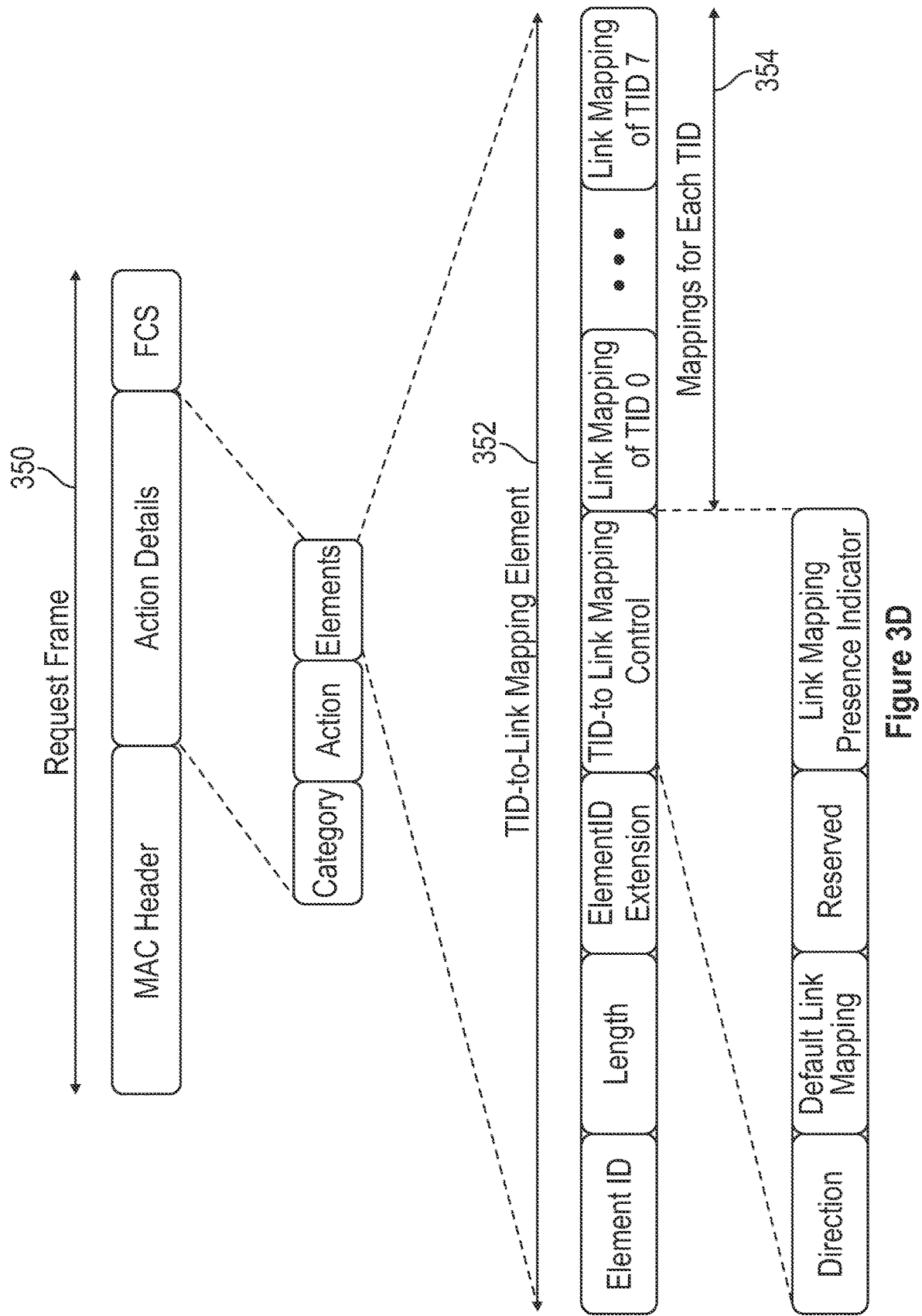
FIG. 3D depicts a request frame.
Figure 3E:
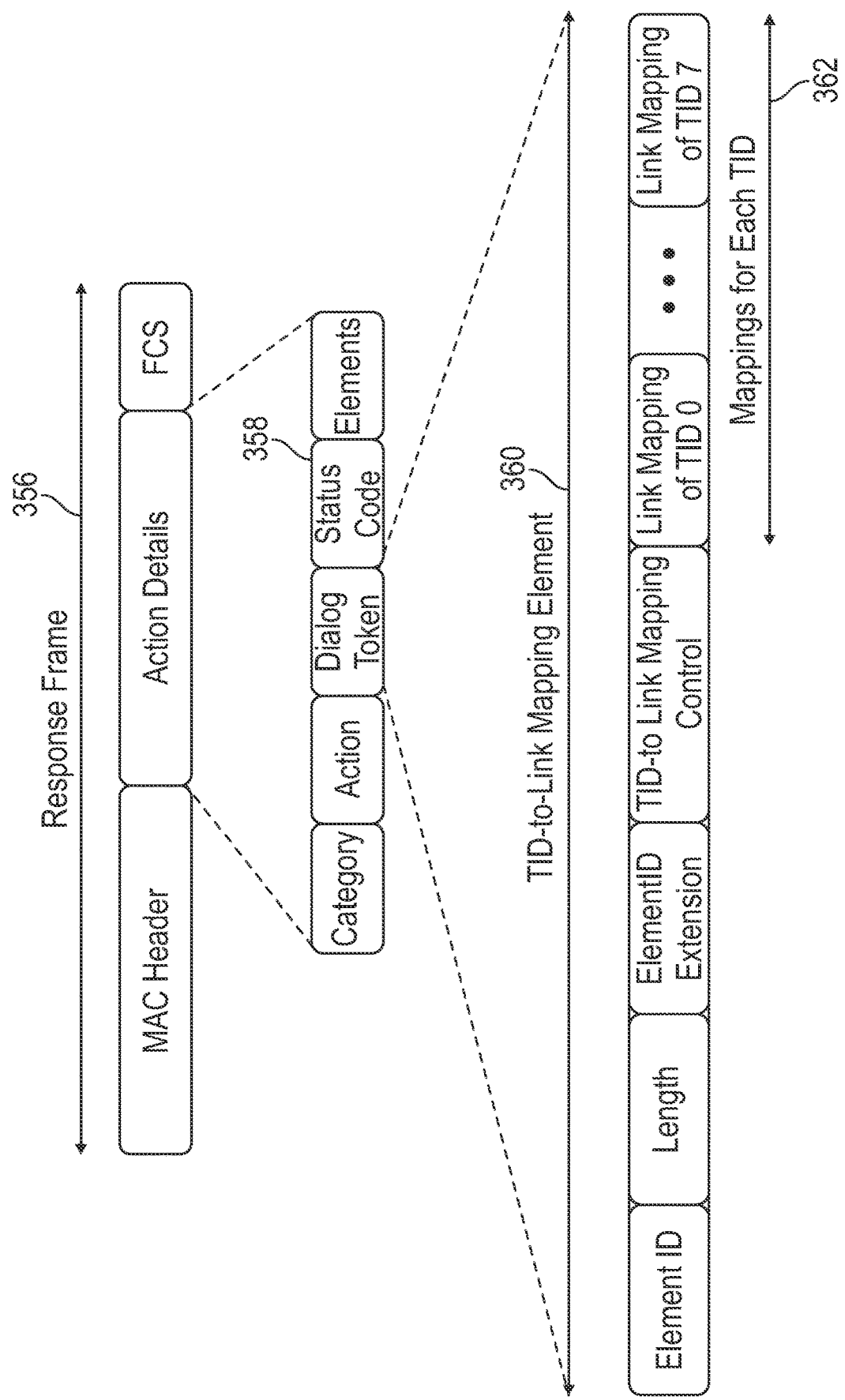
FIG. 3E depicts a response frame.

FIGS. 3C-3E depict link-level frames for identifying a quality of service associated with a traffic type and frames for negotiating TID-to-Link mappings.

FIG. 3C depicts a MAC header that carries the QoS field. The MPDU includes a MAC header 344 and a data portion 346. The MAC header 344 includes a quality of service (QOS) field, which includes a traffic identifier (TID) field 348. The TID field 348 includes a user priority field that identifies the traffic type. The user priority field values range from 0 to 7, with each priority number mapped to an access category. Priorities 1 and 2 are assigned to background activity (i.e., background or non-time-sensitive traffic). Priorities 0 and 3 are assigned to best-effort traffic. Priorities 4 and 5 are assigned to video traffic, and priorities 6 and 7 are assigned to voice traffic. Thus, the user priority numbers are a priority metric that refers to a traffic category.

In addition, a TID-to-link mapping element can be used in a TID-to-link Mapping Request frame sent by a multi-link device (MLD) to negotiate a mapping with another MLD. This mapping element determines the assignment of traffic categories to active links of the AP MLD and non-AP MLD. By default, all TIDs are mapped to all of the links. An MLD receiving a TID-to-link mapping can respond with a response frame indicating whether it accepts or rejects the requested mapping. (Re) Association Request and Response frames can also be used for the negotiation.

FIG. 3D depicts a request frame 350 that includes a TID-to-Link Mapping element 352 in its elements field. TID-to-Link Mapping element 352 includes a TID-to-Link Mapping control field and optional Link mappings 354 of TID numbers 0-7.

The TID-to-Link Mapping control field includes a direction field, a default link mapping, a link mapping size, and a link mapping presence indicator.

The direction field is set to 0 (Downlink) if the TID-to-Link Mapping element provides the link mapping information for the downlink frame. In one embodiment, it is set to 1 (Uplink) if the TID-to-Link Mapping element provides the link mapping information for the uplink frame. It is set to 2 (Bidirectional Link) if the TID-to-Link Mapping element provides the link mapping information for both the uplink and downlink frames. In one embodiment, the value of 3 is reserved.

The default Link Mapping field is set to 1 if the TID-to-Link Mapping element represents the default link mapping. Otherwise, it is set to 0.

The Link Mapping Presence Indicator field represents which Link Mapping of TID n field is present in the TID-to-Link Mapping element. A value of 1 in bit position n of the Link Mapping Presence Indicator field means that the Link Mapping of TID n field is present in the TID-to-Link Mapping element. Otherwise, the Link Mapping of TID n field is not present in the TID-to-Link Mapping element. When the Default Link Mapping field is set to 1, this field is reserved.

The Link Mapping 354 of TID n field (where n=0-7) indicates the links on which frames belonging to the TID n are sent. A value of 1 in bit position i of the Link Mapping of TID n field means that the Link associated with the link ID i is used for exchanging frames belonging to the TID n.

FIG. 3E depicts a response frame. The response frame 356 is similar to the request frame 350 but contains a status code 358. Status code 358 is capable of indicating whether the TID-to-Link Element 360, which includes Link mappings 362 for each TID, is a preferred mapping or not.

Figure 4:
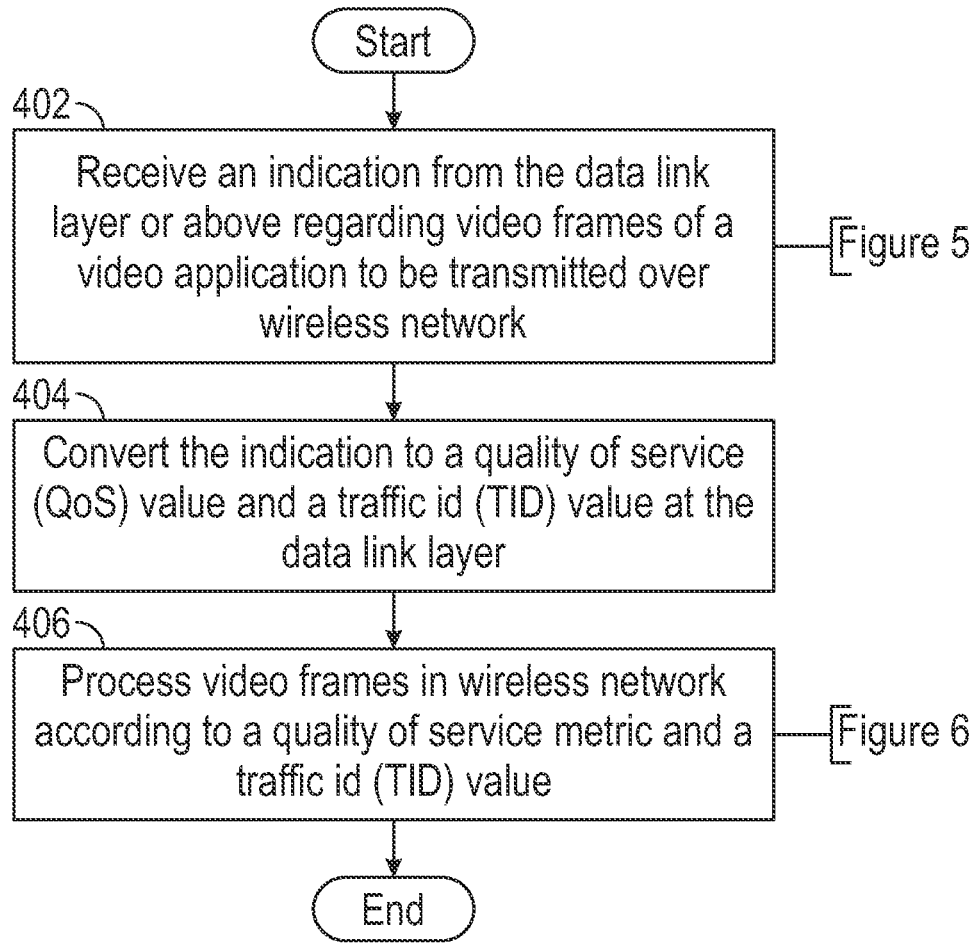
FIG. 4 depicts a flow of operations for processing video frames in a network, in an embodiment.

FIG. 4 depicts a flow of operations for processing video frames in a network, in an embodiment. In block 402, the AP receives an indication (or marking) from the data link layer or above (such as the application layer or the network layer) that video frames of a video application (or extended reality application) are to be transmitted over the wireless network. Further details for block 402 are provided in FIG. 5.

In block 404, the video frames of the video application (or extended reality application) are converted from the indication (i.e., marking) in block 402 to a QoS value and a TID value at the data link layer. In one embodiment, the source stack converts RTP to DSCP, and the AP converts DSCP to a QoS and TID value. In another embodiment, the AP inspects the RTP's D and P bits and uses D and P or D and P bits and DSCP to select the TID value. In block 406, the wireless network processes (how it should be queued and transmitted) the video frames according to the QoS and TID values. Further details for block 406 are provided in FIG. 6.

Figure 5:
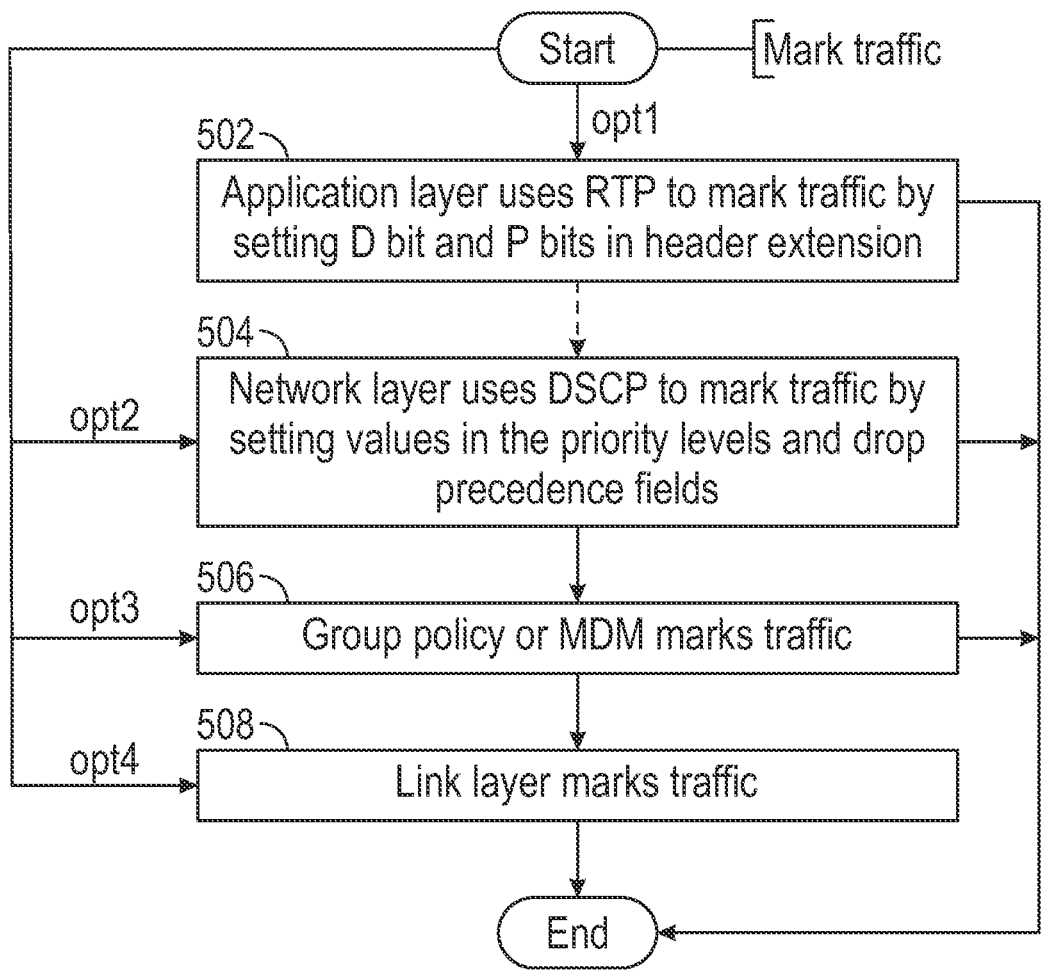
FIG. 5 depicts a flow of operations for marking traffic, in an embodiment.

FIG. 5 depicts a flow of operations for marking traffic, in an embodiment. There are four options for marking the traffic to indicate they are video frames of a video application.

In option 1, the application layer uses the RTP to mark or indicate the video traffic in block 502. In particular, the application layer indicates that the video frames are of high priority by using the D bit and P bits in the extension header 326. For example, option 1 applies when the source of the video stream is server 276 connected to the external network 262.

In option 2, the network layer uses the DSCP field to indicate that the traffic is video traffic in block 504. The DSCP field comprises a six-bit field that includes management pools 1, 2, and 3, where a management pool is a set of codepoints to be managed according to a specific policy according to RFC 2474, Section 6. In particular, pool 1 consists of 32 recommended code points; pool 2 consists of 16 codepoints that are reserved for experimental or local use and are independent of the DSCP values used for QoS classification; and pool 3 consists of 16 codepoints that are available for experimental or local use but which should be used to extend pool 1. In some embodiments, pool 2 is selected to affect the frames' processing at the link layer level. In some embodiments, the network layer sets the DSCP field according to the markings of the application layer. For example, option 2 applies when the source of the video stream is server 276 connected to the external network 262.

In option 3, the video traffic is marked by a group policy or mobile device management (MDM) policy in block 506, where a group policy or MDM policy is a mechanism that delivers a collection of settings to a set of users. For example, an application (e.g., WebEx) on each station in a group, such as the smartphones of a set of employees, sends packets to the smartphone's operating system network stack and group policy via a group policy object (GPO) indicates that the application has high priority. In one embodiment, the GPO includes DSCP values for packets, such as independent and discardable.

In option 4, the video traffic is marked at the link layer in block 508. In one embodiment, the AP receives a management frame that describes how the AP can detect I-frames and non-I frames. In another embodiment, the AP receives an SCS transmission from a non-AP station classifying the traffic. As an example, option 4 applies when the source of the video stream is STA 1 268 via the wireless medium 266.

Figure 6:
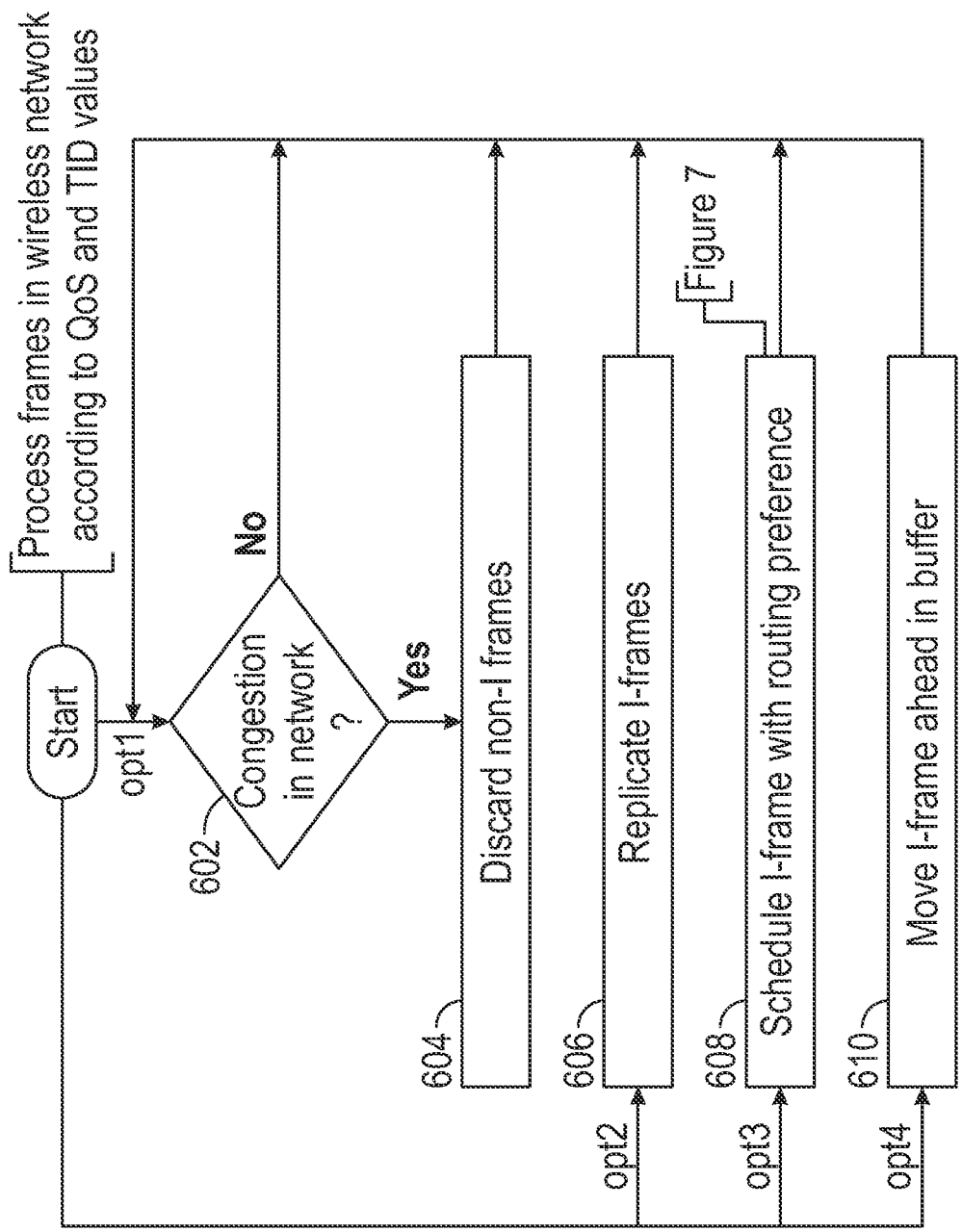
FIG. 6 depicts a flow of operations for processing video frames in a wireless network, in an embodiment.

FIG. 6 depicts a flow of operations for processing video frames in a wireless network, in an embodiment. There are four options for processing based on the QoS and TID values derived from the markings at the layers above the data link layer. In option 1, the AP determines whether there is congestion in the network in block 602. If so, the AP causes non I-frames to be discarded in block 604. In option 2, the AP replicates the transmission of the I-frames for reliable delivery in block 606. In option 3, the AP schedules I-frame traffic with a routing preference in block 608, which is further described in reference to FIG. 7. In option 4, the AP causes the I-frame to move ahead in the buffer in the AP in block 610.

Figure 7:
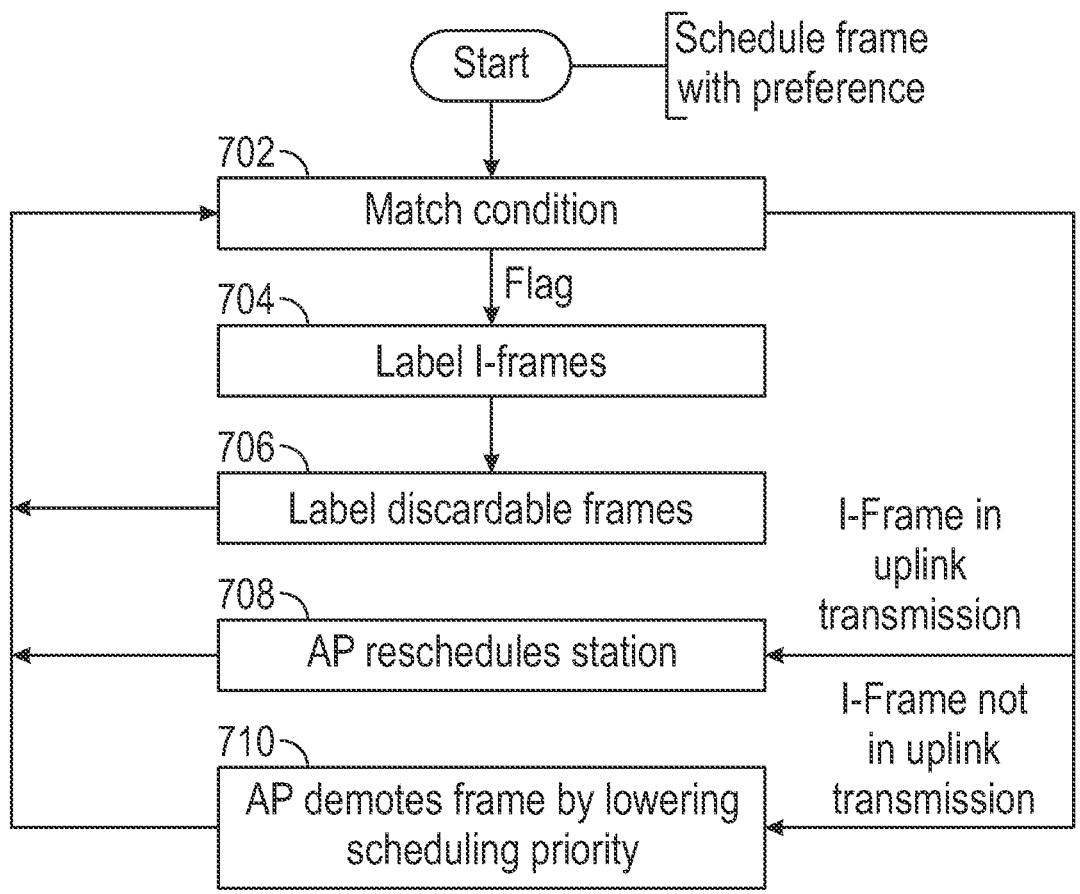
FIG. 7 depicts a flow of operations for scheduling a video frame with preference, in an embodiment.

FIG. 7 depicts a flow of operations for scheduling a video frame with a routing preference, in an embodiment. In block 702, the AP matches one of three conditions. A flag, based on the RTP header or the DSCP field, is added to the TID value in one condition. The flag indicates that the frame has higher priority. For example, an I-frame and a B-frame in a buffer of the AP are labeled as 'I-frame' in block 704, and non-I frames or redundant B-frames are labeled 'Discardable frames' in block 706. Thus, the AP scheduler attempts to provide slots in priority (for a given TID) to STAs displaying the presence of high-importance frames.

In another condition where an I-frame is found in an up-link transmission, the AP reschedules the STA in block 708 for further uplink transmissions with high priority until non-I frames are received from the STA, whereupon the AP schedules the STA at lower or normal priority until a new I frame is received from the STA. In another condition where an I-frame is not found in the up-link transmission, the AP demotes the frame in block 710 by changing the scheduling priority of the STA in the AP's scheduler.

Figure 8A:
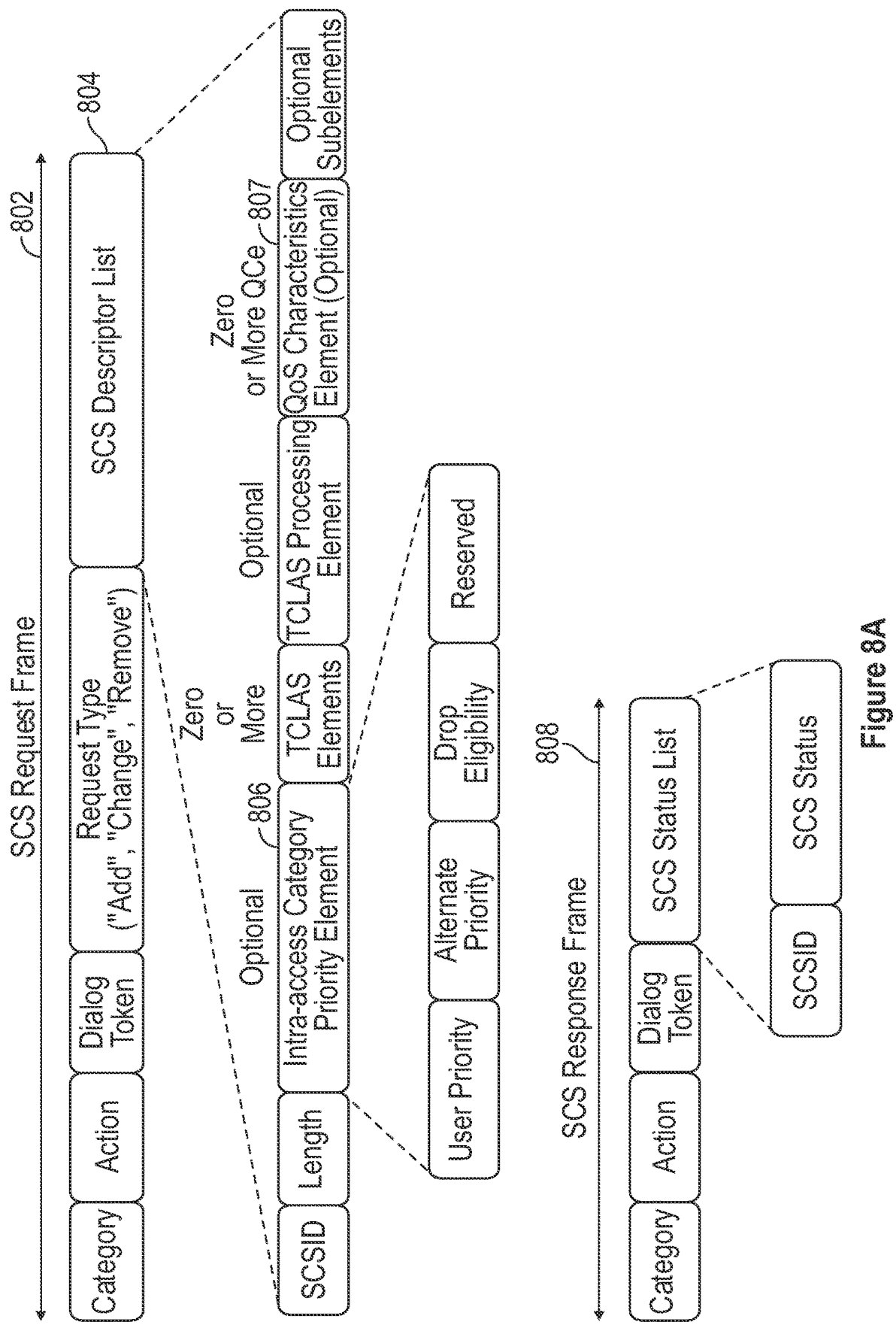
FIG. 8A depicts a stream classification service (SCS) request and SCS response frames.

FIG. 8A depicts request and response frames in an SCS. In SCS, a transmission (i.e., an SCS request or response) includes an augmented QoS characteristics element that describes the flow structure (i.e., I-frames and discardable frames). In SCS, a non-AP STA sends a request to specify traffic classes for classification and the priority to assign to matching frames. The AP may accept or reject the traffic class specified by the non-AP STA. If the AP accepts the service, the AP processes the MAC level frames matching the classification in the SCS descriptor.

In FIG. 8A, the SCS request frame 802 includes a category field, an action field, a dialog token, a request type, and an SCS descriptor list 804. The SCS descriptor list 804 includes an SCS ID field, a length field, an optional intra-access category priority element 806, zero or more traffic classification (TCLAS) elements, optional TCLAS processing elements, and zero or more QoS Characteristics Elements (QCe) 807. The intra-access category priority element 806 includes a user priority field, an alternate priority field, a drop eligibility field, and a reserved field. The QCe fields 807 allow the station to describe the traffic characteristics and QoS expectations of traffic flows that belong to the SCS stream. Using QCe fields to identify requirements of I-frames and non-I frames separately, such as relative drop eligibility, the AP can look at other packet parameters to identify the I and non-I flows and perform the dropping of frames accordingly.

The SCS response frame 808, sent by the AP back to the requesting STA, includes a category field, an action field, a dialog token, and an SCS status list. The SCS status list includes the SCSID and SCS status.

Figure 8B:
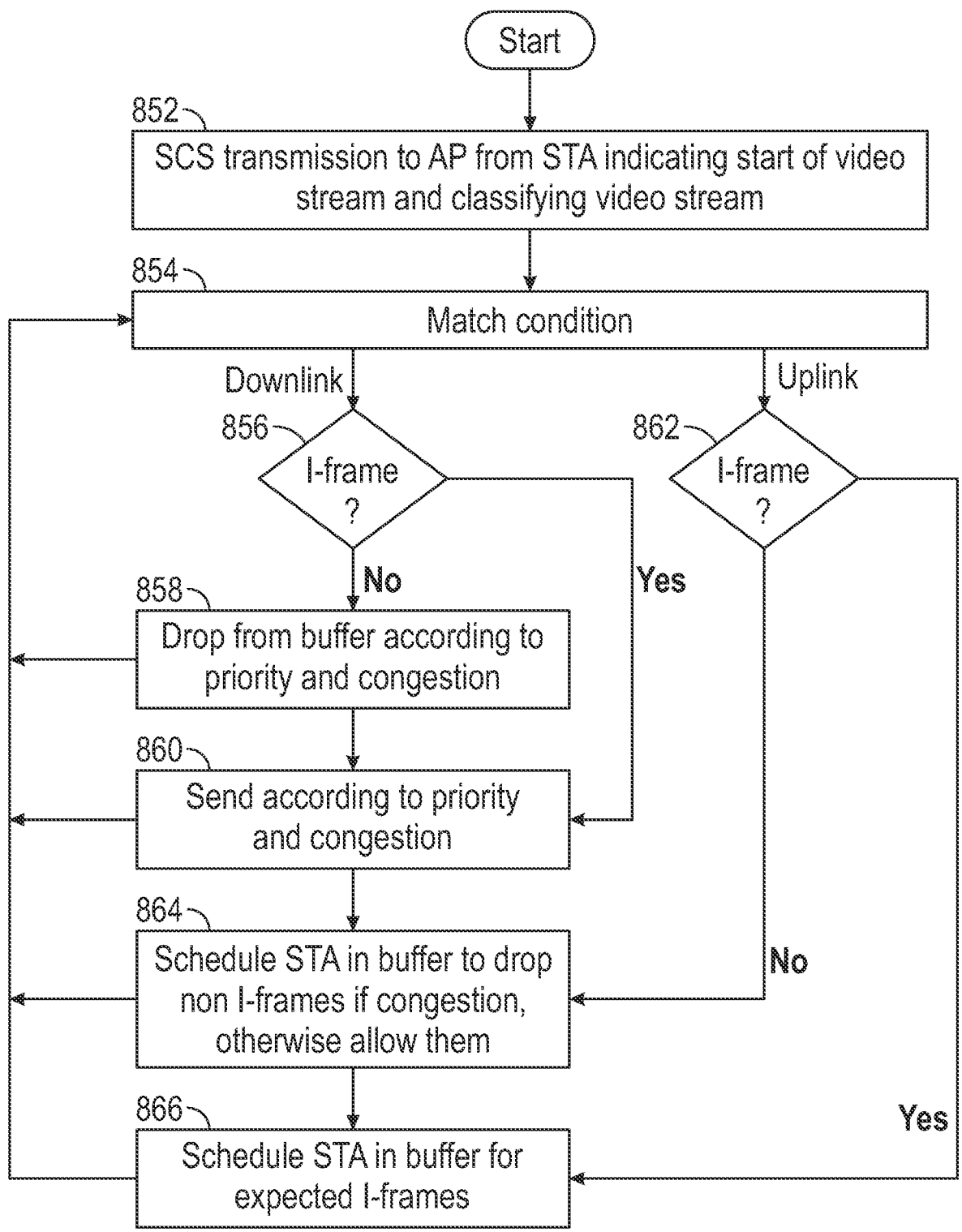
FIG. 8B depicts a flow of operations for processing a stream using SCS, in an embodiment.

FIG. 8B depicts a flow of operations for processing a stream using SCS, in an embodiment. In block 852, the AP receives an SCS transmission from an STA classifying an uplink or downlink video stream. If the case is a downlink video stream, as determined in block 854, then the presence of an I-frame in the stream is determined in block 856. If an I-frame is present in the stream, the I-frame is sent according to the priority identified in the SCS transmission of block 860 and according to the congestion in the wireless network. If a non-I frame is detected, the AP may drop the non-I frame from its buffer according to the priority identified in the SCS transmission of block 858 and congestion in the network.

If the case is an uplink video stream (from the STA to the AP) as determined in block 854, then the presence of an I-frame in the stream is determined in block 862. If an I-frame is present in the stream, the AP schedules the buffer for the expected I-frames from the STA in block 866. If a non-I frame is present in the stream, the AP schedules the buffer to drop the frame if there is congestion but otherwise allows them in block 864.

Figure 9:
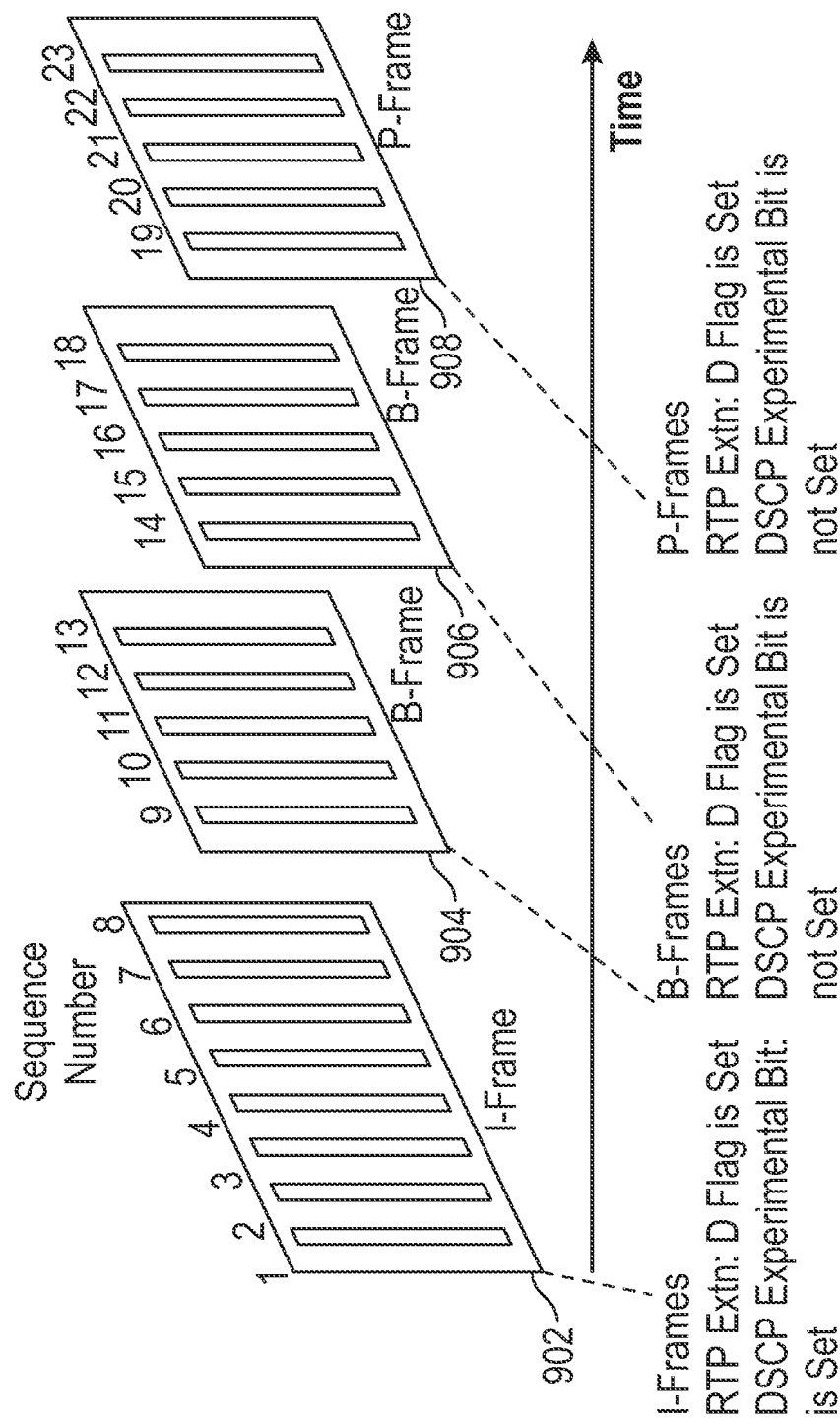
FIG. 9 depicts the markings of the I-frames, B-frames, and P-frames by the RTP or differentiated services control point (DSCP), in an embodiment.

FIG. 9 depicts the markings of the I-frames, B-frames, and P-frames by the RTP or DSCP, in an embodiment. For the I-frame 902, the RTP extension sets the D-flag, and DSCP sets the experimental bit. For the B-Frame 904 and 906, the RTP extension sets the D-flag, and DSCP does not set the experimental bit. For the P-frame 908, the RTP extension sets the D-flag, and DSCP does not set the experimental bit.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer-readable medium(s) having computer-readable program code embodied thereon.

Program code embodied on a computer-readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational blocks to be performed on the computer, other programmable apparatus or other device to produce a computer-implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of improving video throughput in a wireless network, the method comprising:
   receiving an indication from a layer in a network protocol stack regarding video frames of a video application to be transmitted over the wireless network;
   converting a Differentiated Services Code Point (DSCP) in the indication to a quality of service (QOS) value and a traffic id (TID) value at a data link layer; and
   processing the video frames in the wireless network according to the QoS and TID values.

2. The method of claim 1, wherein receiving the indication includes receiving the indication from a network layer, the indication comprising a pool specification in an internet protocol header.

3. The method of claim 1, wherein receiving the indication includes receiving the indication from an application layer, the indication comprising priority bits in an extension header of a real-time transfer protocol.

4. The method of claim 1,
   wherein the video frames include I-frames and non-I frames; and
   wherein receiving the indication includes receiving the indication from a management frame of a data link layer that describes how to detect the I-frames and the non-I frames.

5. The method of claim 1,
   wherein the video frames include I-frames and non-I frames; and
   wherein processing the video frames includes discarding a non-I frame when there is congestion in the wireless network, and the non-I frame is marked as discardable.

6. The method of claim 1,
wherein the video frames include I-frames and non-I frames; and
wherein processing the video frames includes replicating transmission of the I-frames for reliable delivery.

7. The method of claim 1,
wherein the video frames include I-frames and non-I frames; and
wherein processing the video frames includes moving the I-frames ahead of the non-I frames in a buffer to provide a routing preference to the I-frames.

8. The method of claim 1,
wherein the video frames include base layers and enhancement layers; and
wherein receiving the indication includes receiving the indication from a management frame of a data link layer that describes how to detect the base layers and enhancement layers to provide a routing preference to the base layers.

9. An access point for improving video transmission in a wireless network, the access point comprising:
a processor; and
a memory coupled to the processor and having loaded therein a program which, when executed by the processor, is configured to:
receive an indication from a layer in a network protocol stack regarding video frames of a video application to be transmitted over the wireless network;
convert a Differentiated Services Code Point (DSCP) in the indication to a quality of service (QOS) value and a traffic id (TID) value at a data link layer; and
process the video frames in the wireless network according to the QoS and TID values.

10. The access point of claim 9, wherein being configured to receive the indication includes being configured to receive the indication from a network layer, the indication comprising a pool specification in an internet protocol header.

11. The access point of claim 9, wherein being configured to receive the indication includes being configured to receive the indication from an application layer, the indication comprising priority bits in an extension header of a real-time transfer protocol.

12. The access point of claim 11,
wherein the video frames include I-frames and non-I frames; and
wherein being configured to process the video frames includes being configured to discard a non-I frame when there is congestion in the wireless network, and the non-I frame is marked as discardable.

13. The access point of claim 11,
wherein the video frames include I-frames and non-I frames; and
wherein being configured to process the video frames includes being configured to replicate transmission of the I-frames for reliable delivery.

14. The access point of claim 11,
wherein the video frames include I-frames and non-I frames; and
wherein being configured to process the video frames includes being configured to move the I-frames ahead of the non-I frames in a buffer to provide a routing preference to the I-frames.

15. A non-transitory computer-readable medium encoding instructions, which, when executed by a processor of an access point coupled to a wireless medium, cause the access point to:
receive an indication from a layer in a network protocol stack regarding video frames of a video application to be transmitted over a wireless network;
convert a Differentiated Services Code Point (DSCP) in the indication to a quality of service (QOS) value and a traffic id (TID) value at a data link layer; and
process the video frames in the wireless network according to the QoS and TID values.

16. The non-transitory computer-readable medium of claim 15, wherein causing the access point to receive the indication includes causing the access point to receive the indication from a network layer, the indication comprising a pool specification in an internet protocol header.

17. The non-transitory computer-readable medium of claim 15, wherein causing the access point to receive the indication includes causing the access point to receive the indication from an application layer, the indication comprising priority bits in an extension header of a real-time transfer protocol.

18. The non-transitory computer-readable medium of claim 17,
wherein the video frames include I-frames and non-I frames; and
wherein causing the access point to process the video frames includes causing the access point to discard a non-I frame when there is congestion in the wireless network, and the non-I frame is marked as discardable.

19. The non-transitory computer-readable medium of claim 17,
wherein the video frames include I-frames and non-I frames; and
wherein causing the access point to process the video frames includes causing the access point to replicate transmission of the I-frames for reliable delivery.

20. The non-transitory computer-readable medium of claim 17,
wherein the video frames include I-frames and non-I frames; and
wherein causing the access point to process the video frames includes causing the access point to move the I-frames ahead of the non-I frames in a buffer to provide a routing preference to the I-frames.

* * * * *